July 29, 1958     J. P. KELLEHER     2,845,059
BOILING KETTLE

Filed May 6, 1957     2 Sheets-Sheet 1

JOHN P. KELLEHER
*INVENTOR.*

BY Smith & Tuck

July 29, 1958  J. P. KELLEHER  2,845,059
BOILING KETTLE
Filed May 6, 1957  2 Sheets-Sheet 2
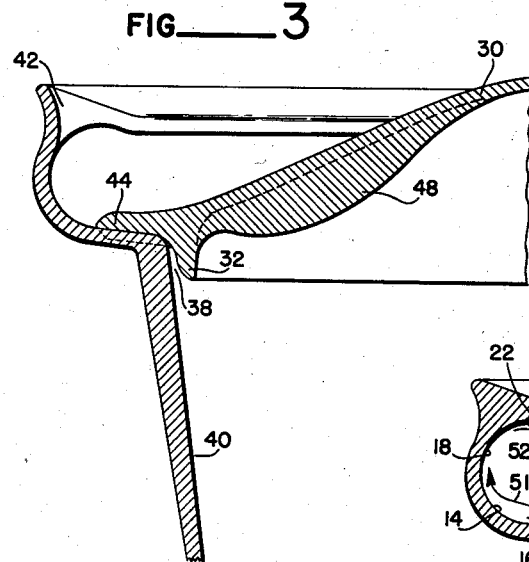
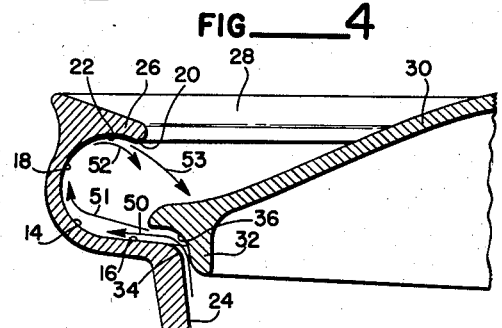
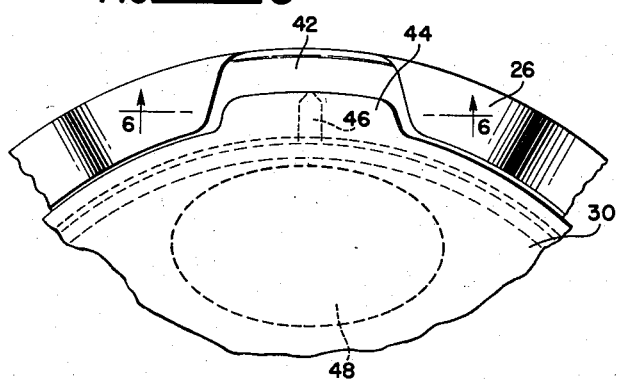
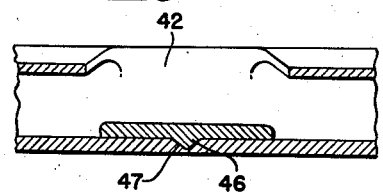
JOHN P. KELLEHER
*INVENTOR.*
BY
*Smith & Tuck*

United States Patent Office 2,845,059
Patented July 29, 1958

2,845,059

BOILING KETTLE

John P. Kelleher, Renton, Wash.

Application May 6, 1957, Serial No. 657,437

2 Claims. (Cl. 126—386)

This present invention relates to the general art of culinary kettles, and more particularly to a kettle designed to permit a full rolling boil in a kettle of minimum capacity. The purpose of this present invention is achieved by providing a kettle having an overhanging annular vapor tract, which insures that steam or vapor that escapes from under the cover of the kettle will be arrested, condensed and returned to the kettle as water.

There are certain cereals and legumes that are best cooked in an excess of water and at a full rolling boil, so that considerable agitation occurs in the mass of cereal, beans, peas or the like being cooked. This present kettle has been found to be very effective in the cooking of rice, in that a full rolling boil can be maintained until the rice is substantially cooked and has lost all of its exterior starch, so that, on being allowed to stand and complete its cooking by steaming, the kernels will all be separate and thus readily adaptable to many forms of food preparation.

In cooking the red or pinto beans, such as those prepared so widely in the southwestern area of the United States by a large percentage of the population, again a full rolling boil can be maintained, and the water that is vaporized as steam is readily condensed and returned to the kettle, so that the beans can be cooked under conditions of severe agitation and thus break down the structure of the bean, and particularly the outer, more dense shell of the bean seed. The Mexican form of cooking these beans is to reduce them to practically a paste, and then this paste, from time to time, is reheated by frying and has become a very considerable part of the staple diet of many of these peoples.

Another excellent use for a kettle of this order and which is not readily found on the market, is in the making of purees and cream soups from peas, beans, lentils and the like. An entirely different effect is obtained by the agitation accompanying a full boil, which cannot be achieved in the various forms of pressure cookers and the like. It is believed, therefore, that my present invention provides a utensil that serves a purpose not adequately served by any of the various utensils that have been observed to date.

The principal object of my present invention, therefore, is to provide a utensil that permits cooking at relatively high boiling temperatures.

A further object of this invention is to provide a boiling kettle and coacting lid which are arranged to valve off water vapor or steam as it is generated under high boiling conditions and to condense this water vapor in an annular ring surrounding the lid and above the same, so that the condensed moisture is returned to the kettle.

A further object of my present invention is to provide means whereby steam generated in cooking, by boiling, is collected in an annular rim surrounding the top of a cooking vessel and which is so formed as to cause the vapor to impinge thereon throughout something over half a circle and finally to be directed against the lid, to the end that it will be adequately condensed and no appreciable amount of water will escape.

A further object of this present invention is to provide a lid that is free to raise on its seat on the top of the pan, but will not raise at the point where a pouring spout is arranged in the kettle.

Further objects, advantages and capabilities will be apparent from the description and disclosure in the drawings, or may be comprehended or are inherent in the device.

In the drawings:

Figure 3 is a fragmentary enlarged vertical sectional view taken through the pouring spout and showing the weighted construction of the lid at this point.

Figure 4 is a view, similarly enlarged as is Figure 3 and illustrating the exact form of vapor escape path and showing how the vapor naturally impinges upon the condensing surface.

Figure 5 is a top plan view of a portion of my kettle, illustrating the pouring spout and the centering lug that insure proper positioning of the weighted kettle lid.

Figure 6 is a vertical sectional view taken along the line 6—6 of Figure 5.

Figure 1:
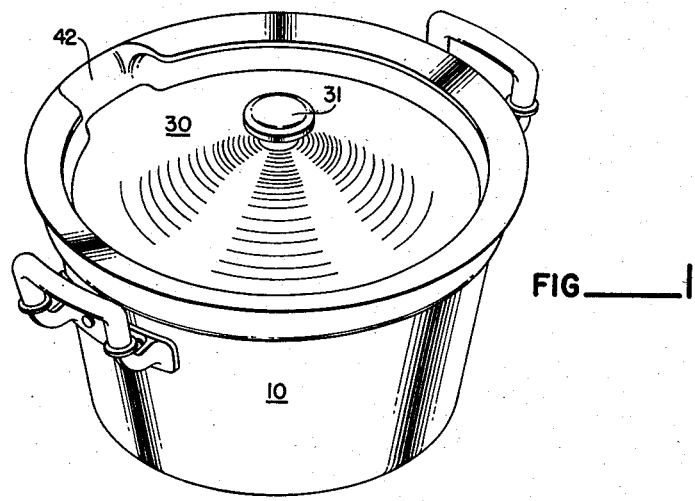
Figure 1 is a perspective view illustrating a boiling kettle made after the teachings of this present invention.
Figure 2:
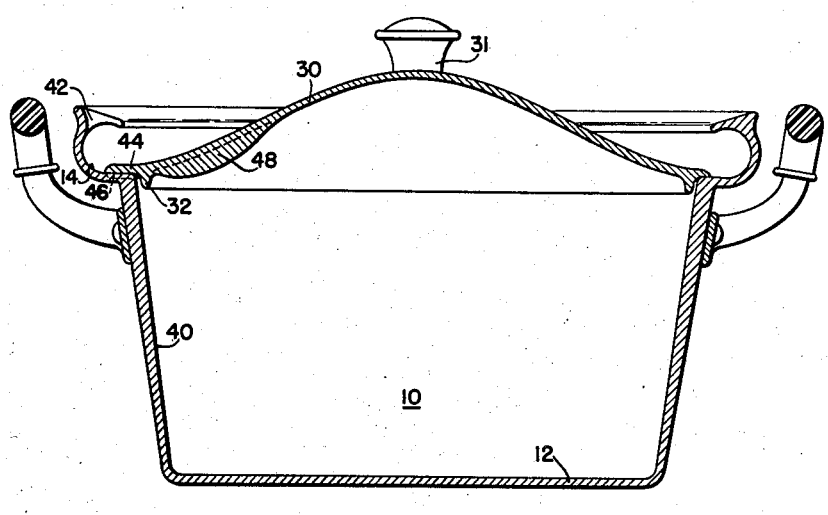
Figure 2 is a vertical cross-sectional view through the kettle of Figure 1.

Referring more particularly to the disclosure in the drawings, the numeral 10 designates the main body of one form of kettle embodying my boiling water retaining pan. In the form shown in Figures 1 and 2, I have provided a kettle with a flat bottom 12. It is to be understood that this is the form most convenient for use on electric and gas stoves of modern design. If, however, the kettle is to be used on wood or coal stoves, it might have a bottom that is quite commonly given to kettles for such use, in which the kettle is designed to fit into the stove lid opening. The form of the body of the kettle, however, does not constitute an important part of this present invention. Disposed annularly around the upper margin of body 10 is a flange in the form of a groove which in cross-section, along a radius of the kettle, would take on a curved form in excess of a half-circle.

The preferred form of this annular rim is shown in Figures 3 and 4, and particularly in Figure 4 which is a typical section through the rim and the margin of the cover at rest. It will be noted that the annular ledge or rim 14 is joined to the body portion by the substantially flat portion 16 which preferably has a slight upward gradient. This flat portion merges into an arcuate or circular portion 18, and this curve is carried up and around until the end 20 is reached. It will be noted that end 20 is considerably beyond the center of the generating radius and is below the high point of the curve at 22. The intent of this arrangement being that, as vapor and steam escape from under lid 30, it is directed around this curved path and finally downwardly onto the lid or cover where it will be further cooled for eventual return to kettle 10.

It is to be noted that the metal forming rim 14 is relatively thin, and this is desirable in that it provides a good radiating surface so that the water vapor and steam impinging on the inside of this curved rim will have its bubbles broken up and be cooled by the air on the outside, and thus condensed. In order to provide adequate strength for this member, particularly as it is under heat and cold which creates expansion and contraction, the upper portion of the wall of vessel 10 is preferably increased in thickness as will be noted at 24. With the same purpose in mind, a rim is provided at 26 that encircles the entire peripheral portion excepting at the pouring spout. The upper portion of this rim 26 is provided with an inwardly sloping surface 28, so that any condensation collecting on this surface will drain back into the kettle.

Adapted to coact with the rim 14 of kettle 10 is the lid or cover member 30. This cover is round in plan view and of a size somewhat less than the diameter joining the flange ends 20 on the opposite sides of the kettle, to the end that the cover may be conveniently removed. The cover is preferably made after the showing of Figure 2, in which there is considerable rise at the center, which tapers downwardly so that any condensate that might come to rest on the upper surface of lid 30 will drain down onto ledge 16 where it will be in position to flow back into the kettle the first time the cover is raised by steam pressure, at that particular point. Cover 30 is provided with the usual convenience handle 31, and on its lowermost face it is provided with the downwardly extending flange 32, which is annularly disposed around the cover.

Attention is particularly directed to the proportions illustrated in Figures 3 and 4, in which it will be observed that the kettle body is provided with a curved portion 34, and the lid or cover 30 is provided with a curved portion 36 which is struck with a considerably longer radius. This gives the effect, as probably best illustrated in Figure 3, in which an appreciable clearance is provided at 38. This arrangement insures a nozzle-like discharge when the lid is forced up by internal pressure, and also insures adequate clearance so that the lid can be raised on one side only and not experience any interference between rim 32 and point 34 of the kettle wall 40. It is further desirable that curve 36 merge into a short tangent portion which will normally be parallel to and rest in snug engagement with the annular surface 16. This arrangement tends to direct any steam or water vapor escaping from the kettle against the inner surface of rim 14, so that it will tumble around the curve and, because of the full impingement with the relatively cold rim, condensation will be sufficient and there will be no loss of water in the form of steam or at least that the same will be reduced to the very minimum.

In keeping with the desirable characteristics of cooking kettles, this boiling kettle is provided with a pouring spout 42 which is probably best illustrated in Figures 3 and 5. In this form it will be noted that flange 26 is cut away for a limited portion of its circumference so as to form the pouring spout. It is very desirable to provide means whereby the cover 30 will not be forced off its seat adjacent the pouring spout, as otherwise steam might escape out through the spout, which would be objectionable and wasteful of cooking water. The most successful arrangement to achieve this end, is to provide an extended lip 44 on a short portion of the periphery of the cover 30 and then to provide in the seat portion coacting positioning or stop means as a downwardly extending V-shaped lug 46, which will engage a V-shaped depression 47 in shelf 16 of the kettle, to the end that the cover can be conveniently and accurately seated with lip 44 opposite the pouring spout 42. This is achieved without any overhanging hold-down lugs which might tend to build up excess pressures and which would be most undesirable.

Experience has shown that the internal pressures generated by the boiling water are equally expended in all directions, and then, if weight is added at one point of the lid periphery, that portion will not be raised from ledge 16 during the boiling operation. I have indicated such a weight at 48, to the end that the weighted portion of the periphery of the cover will be held snugly against its seat and no steam or water vapor will escape out through the pouring opening 42.

In Figure 4, the flow of vapor or steam is illustrated by arrows 50, 51, 52 and 53 as it occurs when the internal pressure has raised the cover 30 momentarily. The flow shown by arrow 50 shows the movement through a nozzle-like passageway which is most restricted at 34 and then expands. This expansion reduces the velocity of the vapor and insures that it will impinge on surface 16. Its momentum assisted by further fluid draft will carry the vapor around the curved surface 18, where condensation occurs. Some of the vapor may pass by surface 16 and impinge directly on curve 18, as indicated by arrow 51. As the condensate loses velocity it will start to fall, as indicated by arrows 52 and 53, and finally come to rest on cover 30. The condensate will then drain downwardly to shelf 16, where it will collect until the cover opens near the point of collection, and it will then flow back into the kettle.

It is believed that it will be clearly apparent from the above description and the disclosure in the drawings that the invention comprehends a novel construction for boiling kettles.

Having thus disclosed the invention, I claim:

1. A boiling kettle, comprising: a kettle-shaped body having at its upper margin a flange in the form of a groove which in cross-section, along a radius of the kettle, has a curve which terminates in an upper downwardly directed portion; a cover for said kettle adapted to seat within said groove and at a distance below said downwardly directed portion; said cover having a raised center portion to insure drainage to the margin of the cover and a downwardly extending flange adapted to engage the inner surface of the kettle wall and center said cover; a pouring spout formed in said flange groove; a lip extension of said cover having a width and length to just conveniently pass through said spout opening coacting means disposed on the cover and on the kettle body for centering said lip in the pouring opening of said spout; a weighted portion formed on said cover disposed adjacent to and in alignment with said lip; said flange groove joined to the upper wall portion of the kettle by an inwardly sloping shelf; the curved portion of the outer margin of the cover and the juncture between the kettle wall and said sloping shelf having coacting forms adapted to direct steam or water discharge from the kettle onto the lower surface of the groove flange disposed above said cover margin.

2. A boiling kettle, comprising: a kettle-shaped body having at its upper margin a flange in the form of a groove which in cross-section, along a radius of the kettle, has a curve which terminates in a downwardly directed portion; a cover for said kettle adapted to seat within said groove at a distance below said downwardly directed portion and disposed to direct escaping steam or water vapor into said groove; said cover having a central dome to insure drainage to the margin of the cover; a pouring spout formed in said flange groove; a complementary lip extension of said cover and means for assisting in positioning said lip in alignment with said spout and adjacent thereto; a weighted portion formed on said cover adjacent said lip.

References Cited in the file of this patent

UNITED STATES PATENTS 1,371,718     Zimmermann _____ Mar. 15, 1921

FOREIGN PATENTS 964,926     France _____ Feb. 8, 1950
367,681     Great Britain _____ Feb. 25, 1932